United States Patent [19]
Winner, Jr.

[11] Patent Number: 5,598,142
[45] Date of Patent: Jan. 28, 1997

[54] VEHICLE ACCESSORY PROTECTION SYSTEMS

[75] Inventor: James E. Winner, Jr., Hollywood Beach, Fla.

[73] Assignee: Winner International Royalty Corporation, Sharon, Pa.

[21] Appl. No.: 566,688

[22] Filed: Dec. 4, 1995

Related U.S. Application Data

[62] Division of Ser. No. 258,076, Jun. 10, 1994, abandoned.

[51] Int. Cl.$^6$ ..................................................... B60Q 1/00
[52] U.S. Cl. .................... 340/438; 340/426; 340/428; 340/568; 307/10.2; 180/287; 116/214; 109/20; 109/29
[58] Field of Search .................................. 340/438, 426, 340/428, 429, 430, 566, 587, 588, 683, 541; 307/10.2, 10.3; 180/287, 271; 116/214; 109/20, 29, 31, 32

[56] References Cited

U.S. PATENT DOCUMENTS

| | | | |
|---|---|---|---|
| 3,805,732 | 4/1974 | Reed | 116/94 |
| 3,899,105 | 8/1975 | Fegley | 222/5 |
| 3,967,757 | 7/1976 | Fegley | 222/5 |
| 3,972,447 | 8/1976 | Fegley | 222/5 |
| 4,062,473 | 12/1977 | Fegley | 222/5 |
| 4,079,862 | 3/1978 | Fegley | 222/162 |
| 4,394,934 | 7/1983 | Fegley | 222/5 |
| 4,579,261 | 4/1986 | Arabian et al. | 222/505 |
| 4,867,076 | 9/1989 | Marcene | 109/20 |
| 4,958,142 | 9/1990 | Sayers | 340/426 |

Primary Examiner—Jeffery Hofsass
Assistant Examiner—Nina Tong
Attorney, Agent, or Firm—Vickers, Daniels & Young

[57] ABSTRACT

A security system for preventing unauthorized removal of a vehicle accessory such as a radio from a mounted position on the vehicle comprises a dispensing container containing a pressurized protective material such as a pepper gas and having a dispensing valve displaceable from a closed position to an open position in which the protective material is dispensed from the container. A valve actuating member is responsive to displacement of the accessory from its mounted position to displace the dispensing valve from the closed to the open position whereby the protective material is dispensed from said container.

15 Claims, 3 Drawing Sheets

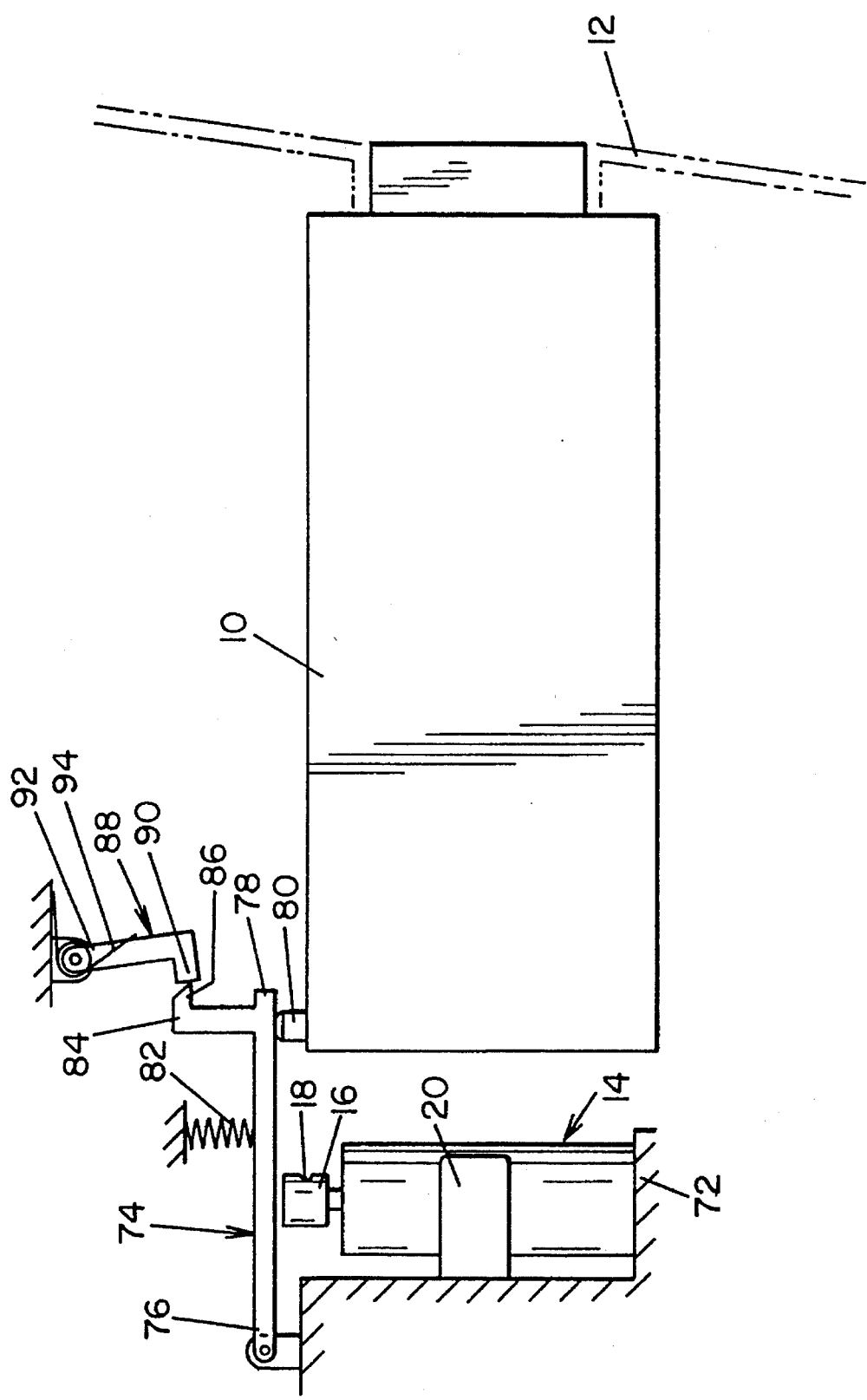

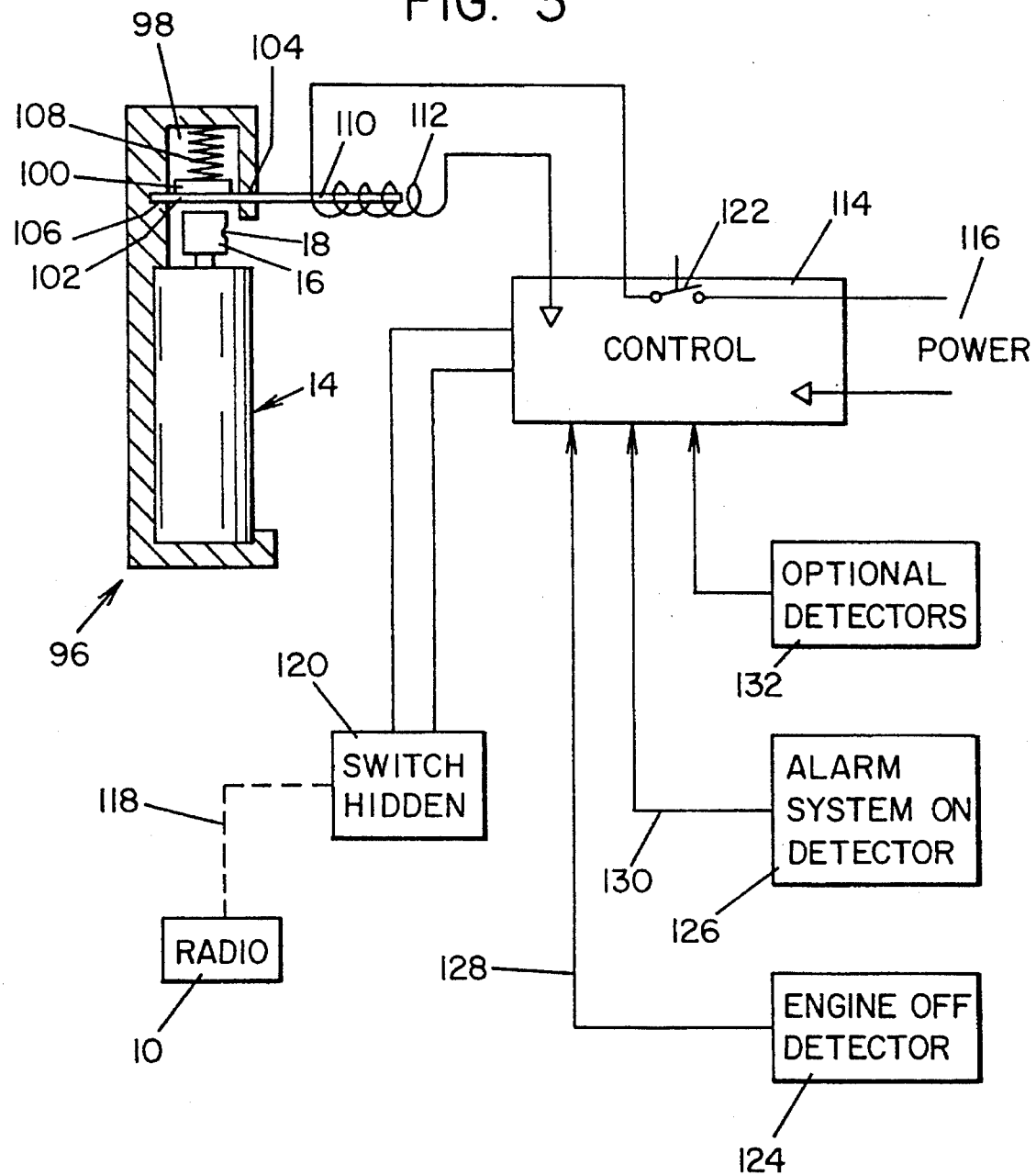

VEHICLE ACCESSORY PROTECTION SYSTEMS

This is a division, of application Ser. No. 258,076 filed Jun. 10, 1994, is abandoned now.

This invention relates to the art of security systems and devices for automotive vehicles, and more particularly to a security system which protects against the unauthorized removal of a vehicle accessory therefrom.

BACKGROUND OF THE INVENTION

It has become quite common for a vehicle owner to install various types of security devices in his or her vehicle in an effort to prevent an unauthorized person from entering and stealing the vehicle. Such security devices include for example, specially constructed steering wheel locks to prevent unauthorized users from steering a vehicle, and simple to sophisticated electronic devices which detect illegal entry, motion and/or sound and, upon such detection activate an audible and/or visible alarm. Other, more elaborate systems respond to a break-in or are activated by the vehicle owner upon leaving the vehicle to deactivate the vehicle's ignition system, battery, fuel supply or the like. Although these various security devices and systems may inhibit or prevent an individual from stealing the vehicle, such devices do not prevent or even deter an unauthorized person from entering the vehicle and removing various items from the vehicle including expensive accessories such as stereos, radios, CD players, cellular telephones and the like. In this respect, if the security system inhibits operation of the vehicle through a steering wheel lock and/or deactivation of a component in the vehicle's power train, it is obvious that such does not deter an unauthorized person from entering the vehicle and removing an accessory or accessories therefrom and, under these circumstances, with little concern for the time required to do so. In so far as visible and/or audible alarms are concerned, it is well known that a thief can enter a vehicle and remove an accessory or accessories in less time than can normally be expected for someone to respond to the alarm or take action to apprehend or scare the thief away. Many unauthorized vehicle entries are for the specific purpose of stealing such accessories, with no intent to attempt to steal the vehicle, whereby it will be appreciated that security devices and systems for the latter purpose do not adequately protect the vehicle owner from the theft of expensive accessories including those referred to above.

THE INVENTION

In accordance with the present invention, a security system is provided for preventing the removal, or optimizing deterrence with respect to an attempt by an unauthorized person to remove vehicle accessories such as those referred to above. The theft is prevented by spraying a protective material on the unauthorized person to at least partially disable the person, whereupon the person will cease the theft attempt and leave the vehicle. The security system includes a container containing a pressurized protective material such as mace or a pepper gas. The protective material is released in the vehicle and onto the unauthorized person in the form of a spray or mist when the latter attempts to physically remove the protected accessory. The spray container can be mechanically or electronically actuated in response to displacement of the accessory from its mounted location and, preferably, the actuating control is integrated with a vehicle anti-theft security system or suitable condition detectors so that a sequence or combination of unauthorized entry events or conditions must occur before the container is placed in an operable mode. This assures safety against unintentional or accidental release of the protective material as well as providing protection against such release during authorized removal of the accessory.

In accordance with one aspect of the present invention, the container actuator is a mechanical device and includes a spring biased trigger for depressing the dispensing valve and spray nozzle when the accessory is moved from its mounted position. When so moved, the trigger precludes returning the accessory to its mounted position to turn off the spray. Preferably, the trigger includes a safety latch for locking the trigger in an inoperative position to allow an authorized individual to remove the accessory for maintenance, repair and/or replacement.

In accordance with another aspect of the present invention, the container actuator is electronically controlled and such control is integrated with one or more condition detection or sensing devices relating to conditions of or within the vehicle such as the open or closed condition of a vehicle door or doors, whether the operator's seat is occupied, whether an alarm system in the vehicle is activated, whether the vehicle engine is on or off, and the like. Unless a predetermined combination of such conditions exists at a given time the container cannot be actuated to dispense the protective material. This, either with or without an arming and disarming switch for the entire system protects against accidental or unintentional actuation of the container while permitting authorized access to the accessory. In addition to the foregoing, or as a separate control, the container can be actuated electrically through a control switch physically associated with the accessory whereby, physical displacement of the latter from its mounted position actuates the switch to activate the control circuit and thus the container.

It is accordingly an outstanding object of the present invention to provide an improved security arrangement for deterring unauthorized removal of an automotive vehicle accessory from its mounted location within the vehicle.

Another object is the provision of a security arrangement of the foregoing character wherein a spray of a protective material such as mace or a pepper gas is dispensed onto a person making an unauthorized attempt to remove a protected vehicle accessory.

Still another object is the provision of a security arrangement of the foregoing character wherein the protective material is stored under pressure in a container having a displaceable dispensing valve and spray nozzle arrangement which is actuated in response to physical displacement of the vehicle accessory from its mounted position, Yet another object is the provision of a security arrangement of the foregoing character wherein actuation of the container of protective material can be precluded by an authorized person so as to enable authorized removal of the accessory from the vehicle.

A further object is the provision of a security arrangement of the foregoing character wherein actuation of the container of protective material is controlled so as to preclude an unauthorized person from stopping dispensing of the protective material once such dispensing is initiated.

Yet a further object is the provision of a security arrangement of the foregoing character wherein actuation of the container of protective material requires in addition to displacement of the accessory from its mounted position, the existence of one or more predetermined conditions relating to the vehicle and/or its operation.

Still a further object is the provision of a security arrangement of the foregoing character which provides optimum protection against the accidental and/or unintentional actuation of the container of protective material in the absence of an unauthorized effort to remove the vehicle accessory.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 2 is a side elevation view somewhat schematically illustrating a mechanical arrangement for controlling the actuation of a container of protective material in accordance with the present invention; and FIG. 3 is a block diagram showing another embodiment of electrical circuitry for controlling actuation of a container of protective material in accordance with the invention.

DESCRIPTION OF PREFERRED EMBODIMENTS

Figure 1:
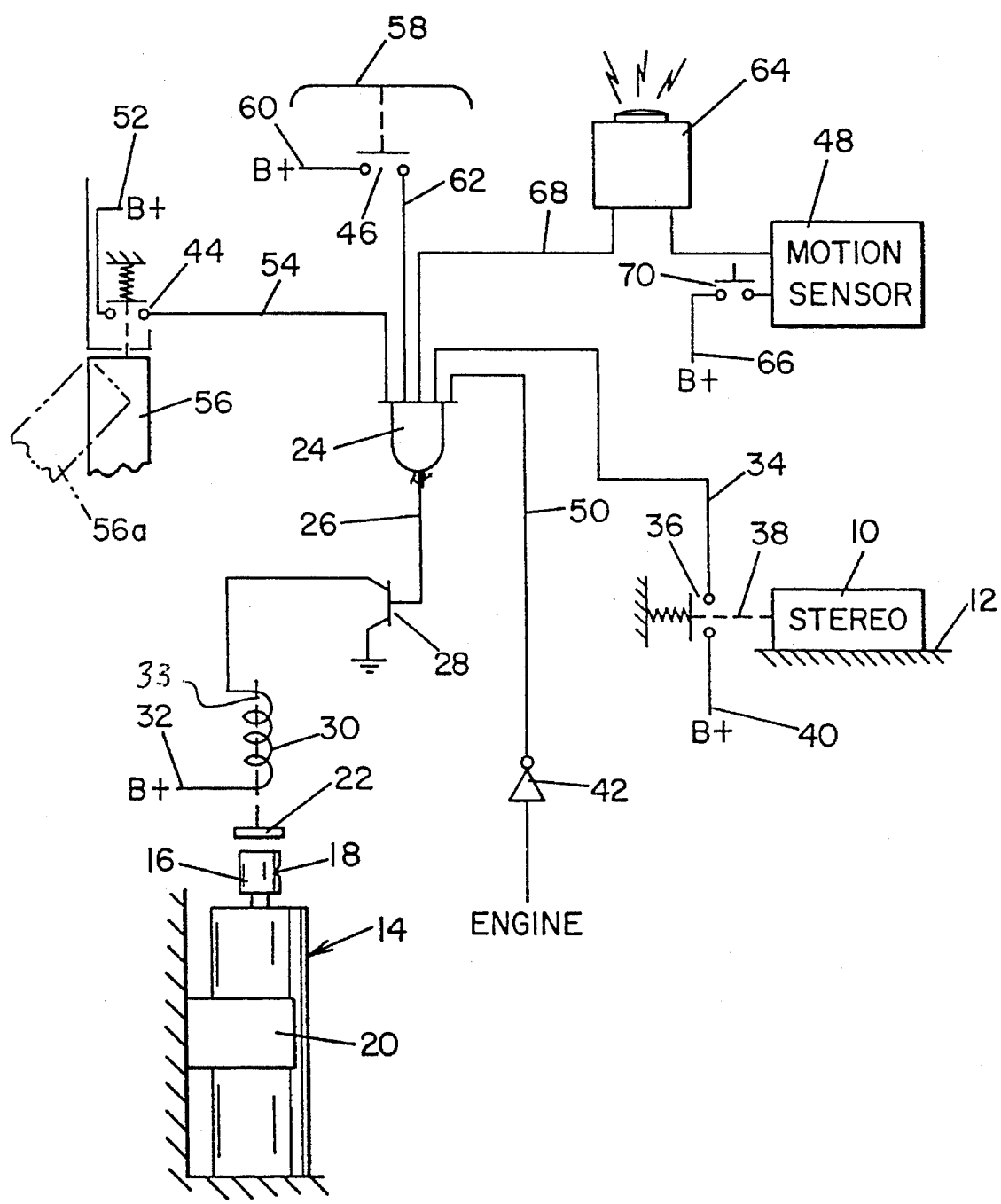
FIG. 1 is a block diagram showing a preferred embodiment of electrical circuitry for controlling actuation of a container of protective material in accordance with the present invention.

Referring now in greater detail to the drawings wherein the showings are for the purpose of illustrating preferred embodiments of the invention only and not for the purpose of limiting the same, FIG. 1 illustrates a security system for preventing the unauthorized removal of a vehicle accessory 10 from its mounted position on the vehicle. Accessory 10 in this embodiment is indicated to be a stereo system which is mounted, for example, in or under the vehicle dashboard as represented by the numeral 12. The security system includes a standard personal protective spray container 14 having a depressible valve element and spray nozzle assembly at the upper end thereof and which includes a spray head 16 having an outlet 18 for directing the contents of the container laterally outwardly therefrom. As is well known, container 14 holds a pressurized protective material capable of being propelled through outlet 18 in a gaseous cloud to at least partially disable a person toward whom the cloud is propelled. Preferably, the protective material is a pepper based spray. However, the material can, for example, be mace or a combination of the latter with a pepper based spray. Container 14 is suitably supported in the vehicle in its upright position, such as by a mounting bracket 20, and preferably is supported behind or otherwise adjacent to accessory 10. As is well known in connection with such spray dispensing containers, the dispensing valve and spray head assembly is biased to a first position normally closing the valve assembly to preclude the dispensing of the container contents through outlet 18 and which first position is represented by the position of spray head 16 in FIG. 1 of the drawing. As is also well known, the dispensing valve and spray head assembly is adapted to be depressed relative to the upper end of container 14 from the first position to a second position in which the dispensing valve is open to allow the gaseous material to be propelled from the container through outlet 18.

In accordance with the present invention, displacement of the dispensing valve and spray head assembly from the closed to the open position of the dispensing valve is adapted to take place in response to the unauthorized displacement of accessory 10 from its mounted position on the vehicle. Accordingly, such unauthorized displacement of the accessory results in the dispensing of a cloud of protective material from container 14, thus to at least partially disable the person attempting to achieve unauthorized removal of the accessory. In the embodiment illustrated in FIG. 1, such displacement of the dispensing valve is achieved by a relay or solenoid operated valve actuating member 22 and, preferably, through an electric control circuit which assures against the unintended or accidental operation of the security system upon displacement of accessory 10 from its mounted position. More particularly in this respect, the control circuit includes an AND gate logic element 24 which receives input signals from a plurality of condition detecting devices as described more fully hereinafter and, in response to receiving the input signals outputs a signal through line 26 to switching device 28. Switching device 28 then connects solenoid coil 30 across a power source 32 such as the vehicle battery to displace actuator member 22 downwardly in FIG. 1 against spray head 16 to displace the container valve to its open position in which the protective material in container 14 is dispensed through outlet 18. In the embodiment illustrated in FIG. 1 the input signals to AND gate 24 necessarily include an input through line 34 indicating that accessory 10 has been displaced from its mounted position. For the latter purpose, a normally open switch 36 is provided in line 34 and is suitably interconnected with accessory 10 such as by a mechanical linkage 38, whereby switch 36 closes upon displacement of accessory 10 to the right in FIG. 1 from its mounted position. Closure of switch 36 provides the input signal to AND gate 24 by connecting the latter to a B+ power source 40 which, again, maybe provided by the vehicle battery.

In accordance with this embodiment, at least one additional input signal is required for operation of AND gate 24, and such additional input signal can be provided by a sensing device for sensing any desired condition in or about the vehicle. Such sensing device or devices can include any one or more of the sensing devices specifically shown in FIG. 1 and which include a sensing device 42 associated with the vehicle engine, a sensing device 44 associated with a door or other compartment closure of the vehicle, a sensing device 46 associated with the drivers seat of the vehicle, and a sensing device 48 associated with an anti-theft alarm system for the vehicle. More particularly with regard to each of the foregoing condition detectors, detector 42 is adapted to transmit an input signal to AND gate 24 through line 50 when the vehicle engine is off which is normally a preliminary condition to theft or vandalism of the vehicle. Detector 44 is shown in the form of a switch operable to close a circuit from B+ power source 52 to AND gate 24 through input line 54 when a vehicle closure member 56 such as an entry door is in an open position as represented by broken line 56a. Condition detector 46 is in the form of a weight actuated switch associated with the drivers seat 58 of the vehicle and which is adapted to close a circuit from B+ power source 60 to AND gate 24 through input line 62 when the drivers seat is occupied. Condition detector 48 is shown as a motion or vibration sensor which, in connection with the vehicle anti-theft alarm system, is operable in response to a predetermined level of vibration or motion of the vehicle, with the alarm system armed, to connect an audible and/or visible alarm device 64 with a B+ power source 66 such that the alarm is actuated in response to excessive motion or vibration. In the embodiment of FIG. 1, such actuation of alarm 64 connects B+ power source 66 with AND gate 24 through input line 68. Preferably, the anti-theft alarm system has an arming switch 70, whereby the system must be both armed and activated in the foregoing manner to transmit the input signal to AND gate 24 through line 68.

As will be appreciated from the foregoing description, before the removal of accessory 10 results in dispensing the protective material from container 14, the vehicle door must be open, the drivers seat occupied, the vehicle engine turned off, and the alarm system armed and activated such as by vibration. If all of these conditions exist, as they most likely would in response to an unauthorized entry and theft attempt, displacement of accessory 10 from its mounted position causes the closure of switch 36 and thus the input to AND gate 24 through line 34. The latter results in the gate outputting a signal through line 26 to switching device 28, whereby the latter is turned on and coil 30 is energized to displace actuator 22 downwardly in FIG. 1 against spray head 16 to depress the latter and open the dispensing valve whereupon the protective material is dispensed through outlet 18. The arrangement optimizes against unintentional or accidental discharge of the protective material from container 14 and thus the debilitating effect thereof on an authorized person in the vehicle. The accessory can be removed by an authorized person simply by avoiding any one of the several conditions precedent to actuating the spray container, the easiest of these being to leave the alarm system disarmed. Further, while it is preferred to require the existence of a plurality of conditions as a prerequisite to operation of the dispensing container it will be appreciated that conditions other than those described above can be required in addition to or in place of the described conditions, and that the system can be designed so that operation of the spray container only requires the existence of any one or more of such conditions in order to protect against accidental or unintentional operation of the spray dispenser. Still further, while it is preferred to protect against the accidental or unintentional actuation of the spray container in the foregoing manner, it will be appreciated that only the switch 36 associated with accessory 10 is necessary to provide the desired protection against the unauthorized removal of the accessory from the vehicle. In this respect, line 34 could be connected directly to line 26 controlling switching device 28, whereby the latter would close in response to closure of switch 36, thus to energize coil 30 and cause dispensing of the protective material as described hereinabove.

FIG. 2 illustrates an embodiment of the present invention which is totally mechanical in structure and operation. In this respect, an accessory 10 such as a radio, tape deck or CD player is mounted behind the vehicle dashboard 12 and container 14 containing protective material as described hereinabove is mounted by bracket 20 behind accessory 10 on suitable support structure 72. In this embodiment, the dispensing container is adapted to be actuated by a lever 74 which extends across spray head 16 and has a first end 76 pivotally connected to support structure 72 and a second end 78 which, when accessory 10 is in its mounted position relative to dashboard 12, engages against the upper end of a projection 80 extending upwardly from the top of the accessory. A spring 82 applies a biasing force against lever 74 tending to pivot the lever clockwise about the pivot axis at end 76 thereof.

The position of lever 74 shown in FIG. 2 is an armed position in which the lever is operable to operate the dispensing container as described hereinafter. Lever 74 is adapted to be pivoted counterclockwise from the position shown in FIG. 2 to a disarmed position in which the lever is held against pivotal displacement under the bias of spring 82, thus to provide for the authorized removal of accessory 10 without actuating the spray container. For the latter purpose, end 78 of lever 74 is provided with an upwardly extending finger 84 having a forwardly extending nose 86 at the upper end thereof, and a latch member 88 having a rearwardly extending nose 90 at the lower end thereof has an upper end 92 pivotally mounted on the vehicle support structure. A biasing spring 94 biases latch member 88 clockwise in FIG. 2, thus biasing nose 90 thereof against nose 86 of finger 84. By pivoting lever 74 counterclockwise in FIG. 2, it will be appreciated that nose 86 moves upwardly along nose 90 which eventually engages under nose 86 through the influence of biasing spring 94 to latch lever 74 against clockwise displacement under the influence of biasing spring 82. In this latched position of lever 74, accessory 10 can be removed by an authorized person without actuating spray container 14. When the accessory is returned to its mounted position, latch 88 is pivoted counter clockwise relative to finger 84 thus releasing lever 74 which then pivots clockwise under the influence of spring 82 for end 78 thereof to reengage projection 80 on accessory 10 to replace the lever in its armed position.

When the component parts are in the positions shown in FIG. 2 in which lever 74 is armed as described above, displacement of accessory 10 from its mounted position releases lever 74 to pivot clockwise under the influence of spring 82 whereby lever 74 engages and depresses spray head 16. This opens the dispensing valve whereby the protective material is dispensed through outlet 18. Should the unauthorized person attempt to return accessory 10 to its mounted position in an effort to stop the spray dispensing operation, end 78 of lever 74 will engage against accessory 10 or projection 80 thereon and thus preclude such repositioning of the accessory and stopping of the dispensing of the protective material.

In the embodiment shown in FIG. 3, spray container 14 is supported on a support bracket 96 which is mounted in a suitable location in the vehicle, and the dispensing valve of the container is adapted to be displaced from the closed to the open position by an actuator arrangement located above spray head 16 and electrically actuated as described hereinafter. More particularly, support bracket 96 includes a downwardly open chamber 98 above spray head 16 and in which dispensing valve actuator member 100 is disposed and supported for vertical displacement relative to the spray head. A pin member 102 is slidably received in a pair of openings 104 and 106 provided therefore in support bracket 96 and which openings are spaced above spray head 16 and accordingly support actuator member 100 in a first or armed position above the spray head. A spring 108 biases actuator member 100 downwardly whereby, upon removal of pin 102 from openings 104 and 106, actuator member 100 is biased downwardly against spray head 16 to depress the later and thus open the dispensing valve for the protective material in container 14 to be dispensed through outlet 18.

Pin 102 has an outer end 110 disposed within a solenoid coil 112, and end 110 operates as an armature within coil 112 such that energization of the coil displaces pin 102 to the right from its position shown in FIG. 3 so as to release actuator member 100 to achieve dispensing of the protective material as described hereinabove. In this embodiment, the control for energizing coil 112 is in the form of a control device 114 which may, for example, be a microprocessor or microchip which is pre-programmed to connect coil 112 across a power source 116 such as the vehicle battery either in response to displacement of accessory 10 from its mounted position in the vehicle, or in response to the latter displacement with one or more predetermined conditions existing with respect to the vehicle. In this embodiment, accessory 10 is shown to be a radio which is mechanically connected as indicated by broken line 118 with a switch 120 which is hidden so as to be unaccessible to an unauthorized person. Switch 120 can be either a normally open or a normally closed switch which would switch to the opposite mode in response to displacement of accessory 10 from its mounted position, and control 114 would be programmed in accordance with the selected character and mode of switch 120. Actuator 118 by which the switch mode is changed can, for example, be a breakable link which would break upon displacement of accessory 10 from its mounted position, or a pull cord which could be either flexible or rigid and which, upon pulling, would change the switch mode. As another example, switch 120 could be a normally closed reed switch with connector 118 being or including a strip of insulating material disposed between the reeds and which would be withdrawn from between the reeds in response to displacement of accessory 10 from its mounted position.

Assuming controller 114 to be programmed to respond only to the actuation of switch 120 upon displacement of accessory 10 from its mounted position, it will be appreciated that such actuation of switch 120 connects solenoid coil 112 across power source 116 to energize coil 112 and thus withdrawal pin 102 from support bracket 96. This, as described above, releases actuator 100 which is then biased by spring 108 to depress dispensing head 116 and thus open the dispensing valve of container 14 whereupon the protective material therein is discharged through outlet 18. Preferably, for the reasons pointed out hereinabove in conjunction with the description of the embodiment in FIG. 1, control 114 is programmed so that actuation of the spray container requires the existence of one or more conditions in or relating to operation of the vehicle. Preferably in this respect, the system is provided with an arm-disarm switch 122 which is hidden and which must be closed in order for the security system to be operable under any circumstances. Switch 122 advantageously provides for an authorized person to remove accessory 10 from its mounted position without having to disconnect the battery or other power supply to the system. Additionally, the system can be provided with one or more condition detectors which, if used, preferably include a detector 124 for detecting when the vehicle engine is turned off and a detector 126 for determining when an anti-theft alarm system in the vehicle is turned on or armed. When such condition or conditions exist, detector 124 provides an input signal to control 114 through line 128 and detector 126 inputs a signal to the control through line 130. Presuming control 114 to be programmed to respond to one or both of the latter input signals, spray container 114 would be actuated thereafter in response to displacement of accessory 10 from its mounted position. As indicated by numeral 132 in FIG. 3, additional detectors can be provided, optionally, to provide further protection against accidental or unintentional activation of the spray container.

While considerable emphasis has been placed on the preferred embodiments of the present invention herein illustrated and described, it will be appreciated that other embodiments can be made and that changes can be made in the embodiments disclosed herein without departing from the principles of the present invention. Accordingly, it is to be distinctly understood that the foregoing descriptive matter is to be interpreted merely as illustrative of the present invention and not as a limitation.

Having thus described the invention it is claimed:

1. A security system for preventing unauthorized removal of a vehicle accessory from a mounted position on a vehicle comprising, dispensing container means containing a pressurized protective material and including valve means displaceable from a closed position to an open position in which said protective material is dispensed from said container means, a valve actuator member for displacing said valve means from said closed to said open position, said accessory in said mounted position thereof holding said actuator member in a first position corresponding to said closed position, means for displacing said actuator member in a direction from said first position toward a second position corresponding to said open position of said valve means in response to displacement of said accessory from said mounting position, and means for releasably holding said actuator member in a third position in which said actuator member is inoperable for displacing said valve means.

2. A security system according to claim 1, wherein said actuator member is a lever having opposite ends, one of said ends being pivotally mounted relative to said vehicle for displacement between said first and second positions, means biasing the other of said opposite ends to engage said accessory in said mounted position thereof, and said valve means being positioned between said opposite ends of said lever.

3. A security system according to claim 1, wherein said accessory has front and rear ends, and means removably mounting said dispensing container means adjacent said rear end of said accessory.

4. A security system according to claim 1, wherein said accessory has a top side, said actuator member engaging said top side in said mounted position of said accessory.

5. A security system according to claim 4, wherein said means for displacing said actuator member includes biasing means for biasing said actuator member against said top side.

6. A security system according to claim 4, wherein said actuator member in said second position thereof is below said top side of said accessory.

7. A security system according to claim 1, and means for blocking return of the accessory to said mounted position.

8. A security system according to claim 7, wherein said means for blocking return of said accessory includes said actuator member in said second position thereof.

9. A security system for preventing unauthorized removal of a vehicle accessory from a mounted position on a vehicle comprising, dispensing container means containing a pressurized protective material and including valve means displaceable from a closed position to an open position in which said protective material is dispensed from said container means, a valve actuator member for displacing said valve means from said closed to said open position, said accessory having a top side, said actuator member engaging said top side in said mounted position thereof holding said actuator member in a first position corresponding to said closed position, and means for displacing said actuator member in the direction from said first position toward a second position corresponding to said open position of said valve means in response to displacement of said accessory from said mounted position, and a means for releasably holding said actuator member in a third position in which said actuator member is inoperable for displacing the said valve means.

10. A security system according to claim 9, wherein said third position is spaced above said top side.

11. A security system according to claim 9, wherein said means for releasably holding said actuator member includes latch means.

12. A security system according to claim 11, wherein said latch means includes a latch member mounted relative to said vehicle for displacement between latched and unlatched positions relative to said actuator member, said latch member in said latched position thereof releasably holding said actuator member in said third position.

13. A security system according to claim 12, further including first biasing means for biasing said actuator member in the direction toward said top side, and second biasing means biasing said latch member toward said latched position.

14. A security system according to claim 13, wherein each said first and second biasing means is a spring.

15. A security system for preventing unauthorized removal of a vehicle accessory from a mounted position on a vehicle comprising, dispensing container means containing a pressurized protective material and including valve means displaceable from a closed position to an open position in which said protective material is dispensed from said container means, a lever having opposite ends, one of said opposite ends being pivotally mounted relative to said vehicle for displacement between first and second positions, means biasing the other of said opposite ends to engage said accessory in said mounted position thereof, said valve means being positioned between said opposite ends of said lever and being displaceable by said lever, said accessory in said mounted position thereof holding said lever in said first position corresponding to said closed position of said valve means, and means for displacing said lever in the direction from said first position toward said second position corresponding to said open position of said valve means in response to displacement of said accessory from said mounted position, and a latch spaced from said one of said opposite ends and pivotally mounted relative to said vehicle, said lever including a latch finger and being pivotal about said one end of said third position in which said latch engages with said latch finger to preclude pivotal displacement of said lever in the direction from said first toward said second position thereof.

* * * * *